United States Patent [19]

Gerdes, Jr.

[11] 4,344,819

[45] Aug. 17, 1982

[54] METHOD OF DETERMINING COKE LEVEL

[75] Inventor: John H. Gerdes, Jr., Bethlehem, Pa.

[73] Assignee: Bethlehem Steel Corporation, Bethlehem, Pa.

[21] Appl. No.: 161,845

[22] Filed: Jun. 23, 1980

[51] Int. Cl.³ .................... C10B 35/00; G01K 7/00
[52] U.S. Cl. .................................. 201/1; 73/292; 201/41; 374/142
[58] Field of Search ............ 73/340, 341, 292, 295, 73/355 R, 344; 201/1

[56] References Cited

U.S. PATENT DOCUMENTS

| | | | |
|---|---|---|---|
| 3,556,947 | 1/1971 | Kumper | 201/1 |
| 3,607,660 | 9/1971 | Kumper | 201/1 |
| 3,653,262 | 4/1972 | Ehrenfried et al. | 73/292 |
| 3,897,311 | 7/1975 | Krenke | 201/1 X |
| 3,982,110 | 9/1976 | Kawai | 364/107 |
| 4,021,309 | 5/1977 | Radstake et al. | 201/1 X |
| 4,121,459 | 10/1978 | MaCall et al. | 73/355 R X |
| 4,176,554 | 12/1979 | Kazmierowicz | 73/341 |
| 4,202,733 | 5/1980 | Lüke et al. | 201/1 |
| 4,203,803 | 5/1980 | Meckel et al. | 201/41 X |
| 4,242,907 | 1/1981 | Kazmierowicz | 73/341 |

OTHER PUBLICATIONS

A. V. Grigorev et al., "Automatic Monitoring of the Uniformity of Coke Cake Heating", *Coke & Chemistry U.S.S.R.*, 1963, No. 12, pp. 14–18.

*Primary Examiner*—Daniel M. Yasich
*Attorney, Agent, or Firm*—Joseph J. O'Keefe; Michael J. Delaney; George G. Dower

[57] ABSTRACT

Instruments measure and periodically store coke vertical temperature profile data sets at multiple coke guide levels within expected level range. Computer detects highest level in each data set above a reference temperature and terminal plots coke level as a function thereof.

8 Claims, 7 Drawing Figures

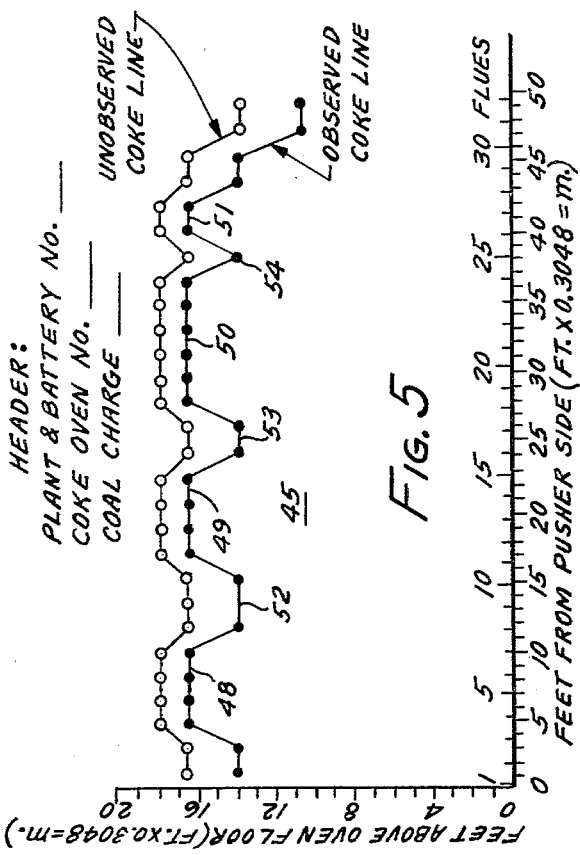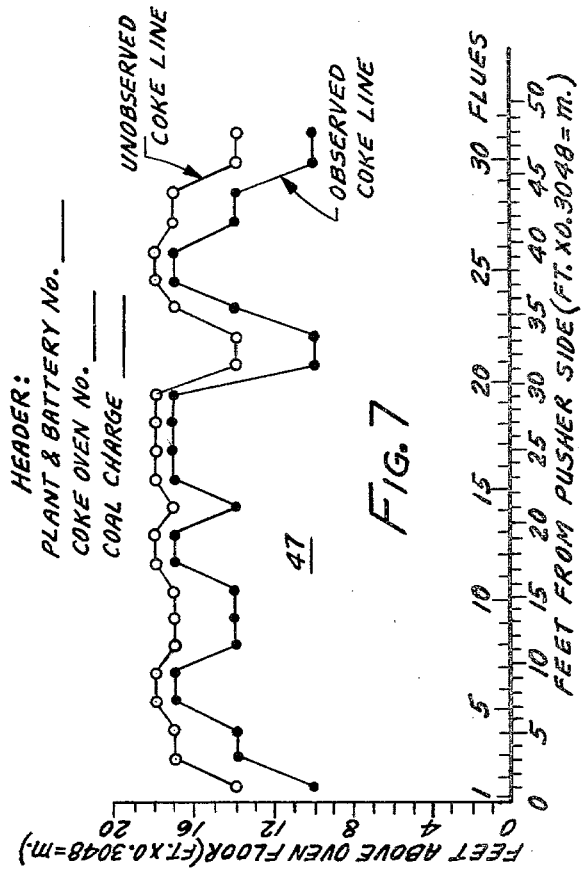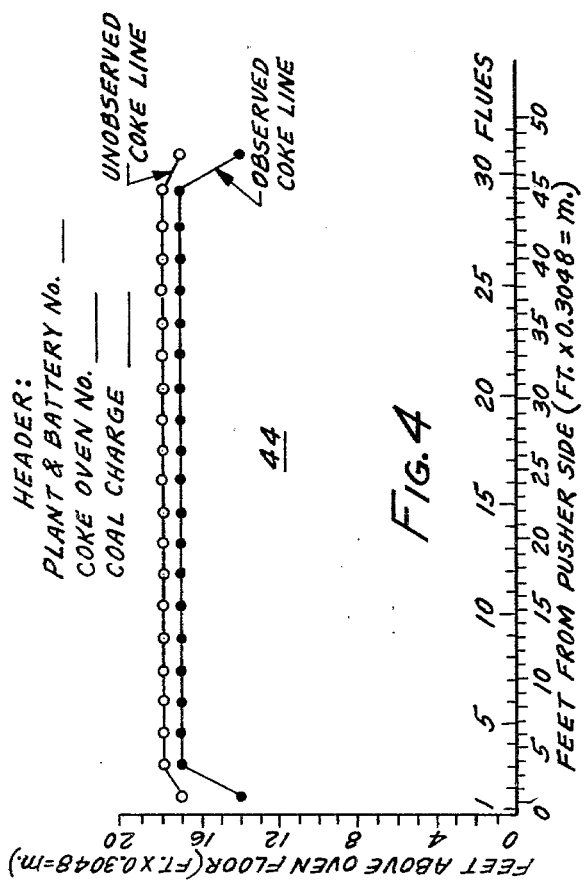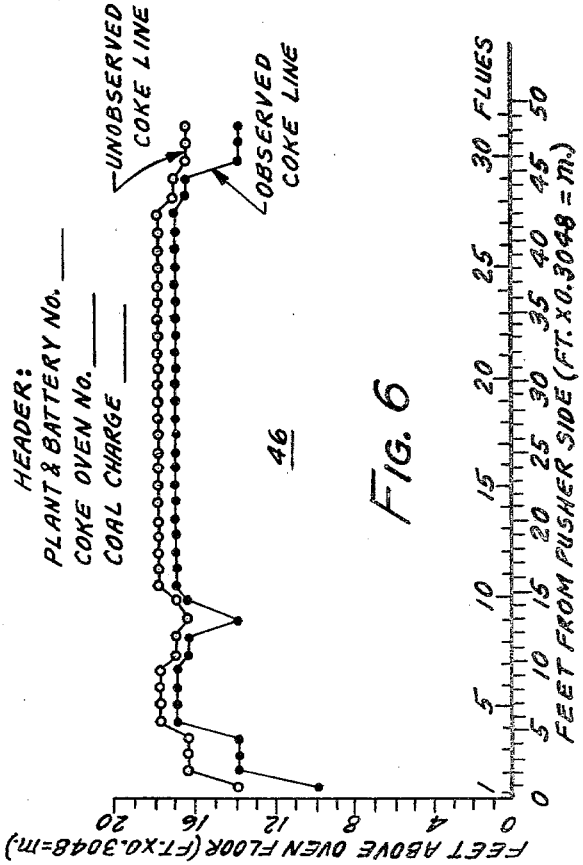

METHOD OF DETERMINING COKE LEVEL

BACKGROUND OF THE INVENTION

1. Field of the Invention

This invention relates broadly to coke ovens, and more particularly to a method of determining coke level during pushing operation.

2. Description of the Prior Art

To effect proper operation of a battery of byproduct coke ovens, each oven must be charged from a larry car, conveyor or pipeline with a predetermined weight amount of coking coal, then leveled by a leveler bar to move peaks of coal below charging holes to valleys therebetween. It is intended that when leveling is completed the charge will fill the maximum predetermined space in the coke oven and that the top of the charge will have a relatively smooth line lengthwise throughout the oven at the start of the coking cycle.

After a suitable heating cycle, an ideal charge will have settled downward and became a coke mass having a theoretical coke line below and parallel to the charge level line. Subsequently, the coke is pushed by a pusher ram on the pusher side of an oven through a coke guide on the coke side of the oven and into a quench car. In the past, an operator at the coke guide visually inspected the coke height at a gap between the oven and coke guide or between the slats of a coke guide during pushing for indications of undercharging the coke oven. However, all batteries currently require emission exhaust controls during pushing which have done away with the gap between the oven and coke guide or slats, thereby preventing visual inspection of coke height during pushing.

Other problems arise in actual practice because ideal battery operations are not always achieved. These are attributable to charging errors and/or heating deficiencies which affect coke height or level at pushing. For example, coal density variations and scale errors directly effect the volume, and therefore level, of coal charged before the coking cycle. Prior art mechanical probes having moving parts inserted through charging holes do not always provide an adequate indication of actual coal level in the oven, nor do they provide a coal level record at any time. In addition, nonuniform gravity distribution of the coal charge will result in an uneven coke level during pushing. Moreover, heating deficiencies caused by variations in overall heating value of fuels, or localized clogging of flues will also have an effect on not only coke value but coke level at the time of pushing operation.

SUMMARY OF THE INVENTION

A main object of this invention is to provide an improved method of determining coke level during pushing operations.

Another object of this invention is to provide a method of determining coke level during pushing operation that will be suitable for use with both enclosed and unenclosed coke guides.

Still another object of this invention is to provide a method of determining coke level without using mechanical probes.

Yet another object of this invention is to provide a method of determining coke level during pushing which will provide a documented record thereof every push.

The foregoing objects may be achieved by providing an improved method of determining coke level during pushing from a coke oven which comprises measuring coke vertical temperature profile data by sensing plural coke temperatures at a coke guide; storing one coke vertical temperature profile data set at each of plural intervals synchronized with the coke oven push; detecting the highest level at which coke was observed in each stored vertical temperature profile data set; and plotting, or otherwise utilizing, the detected level data to represent coke level existent lengthwise along the coke oven before pushing.

BRIEF DESCRIPTION OF THE DRAWINGS

FIGS. 4–7 are coke level charts plotted by a terminal connected to the computer in FIG. 1.

DESCRIPTION OF A PREFERRED EMBODIMENT

Figure 1:
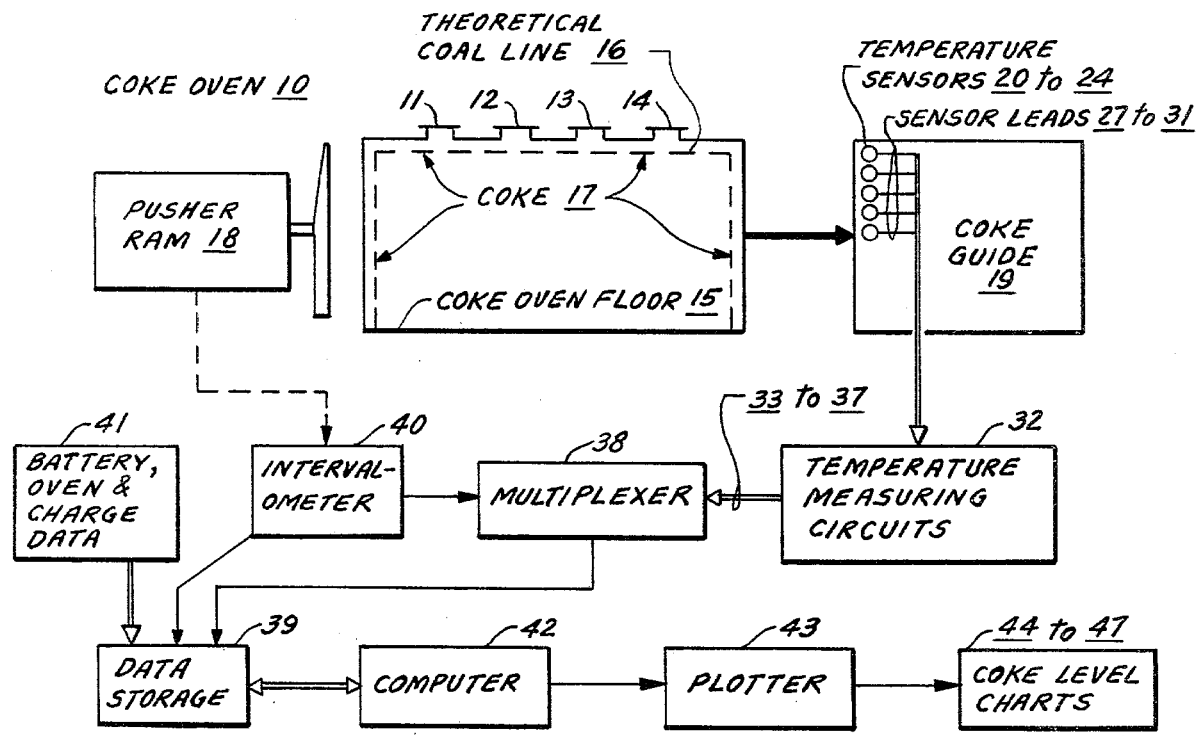
FIG. 1 is a block diagram of computerized coke level detecting apparatus for carrying out the method of the present invention.
Figure 2:
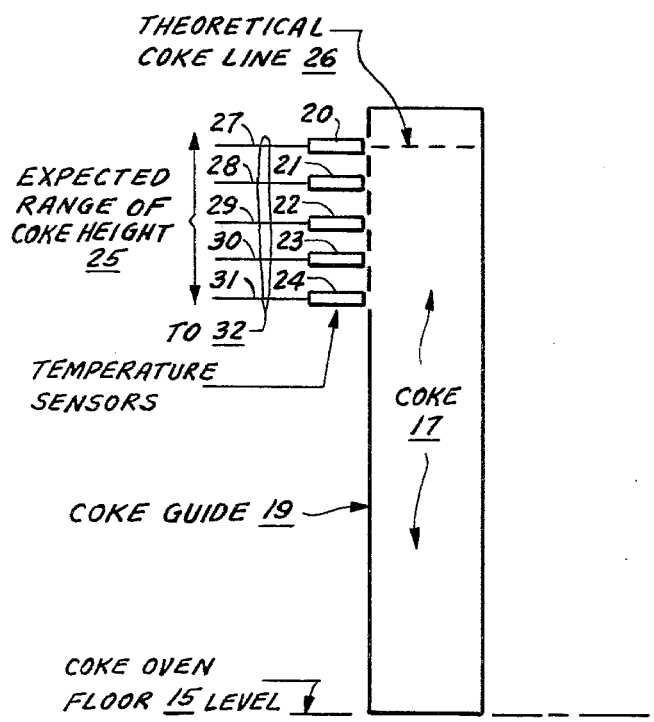
FIG. 2 is a diagrammatic lateral cross-section of a coke guide showing a level range of temperature sensors used in the FIG. 1 apparatus.

Referring to the drawings, particularly FIGS. 1 and 2, apparatus for carrying out the method of this invention is shown in the environment of a conventional by-product coke oven 10. A predetermined weight amount of coking coal is introduced through charging holes 11, 12, 13, 14 to the interior of coke oven 10. Ideally, coking coal is distributed evenly throughout coke oven 10 by a leveler bar (not shown) between coke oven floor 15 and a smooth, fairly even, theoretical coal line 16. All openings are closed and the heating cycle is started. By the time the heating cycle is completed, the coal charge is converted to a mass of coke 17 inside coke oven 10. Doors are then removed by machines not shown and pusher ram 18 pushes coke 17 throughout the length of coke oven 10, through coke guide 19, and into a quench car also not shown.

For purposes of illustration, coke guide 19 is provided with five temperature sensors 20 and 24 mounted in an expected coke height range 25, referenced to coke oven floor 15, to develop coke vertical temperature profile data. Each temperature sensor 20 to 24 may be a fast-acting optical pyrometer having an analog output signal proportional to coke temperature. A pyrometer has the advantage of providing an output signal that is useful not only for coke level analysis, but coke mass and oven wall temperature analysis as well.

Temperature sensors 20 to 24 are mounted at levels in expected coke height range 25, either at equal or unequal heights, and as close to buckstays in coke oven 10 as is possible. In batteries where coke guide 19 is enclosed for emission control purposes, a modification must be made therein to provide a coke-level sight opening for each temperature sensor 20 to 24. In batteries where coke guide 19 is unenclosed, temperature sensors 20 to 24 are aimed through a gap between coke oven 10 and coke guide 19, or between the gap in coke guide slats.

Instead of being a set of optical pyrometers, temperature sensors 20 to 24 may be of other fast-acting thermal responsive devices which produce a digital on type output signal above a preset value and an off signal below the preset value.

Although five temperature sensors 20 to 24 have been illustrated, actually any number of temperature sensors may be configured, depending upon the accuracy of coke level determination desired. A minimum number of temperature sensors recommended is three, each spaced about a foot apart on a six-meter battery. The uppermost temperature sensor is located at theoretical coke line 26. A fourth temperature sensor could be used in either of two ways. By placing it about 6 inches above theoretical coke line 26, it will provide an indication of coke oven 10 overfilling. By placing it below theoretical coke line 26, more accurate information is obtainable regarding coke oven 10 underfilling.

Another five-temperature sensor setup is to arrange them such that one temperature sensor is mounted at theoretical coke line 26, one temperature sensor above coke line 26, and the remaining three below coke line 26. The temperature sensor locations should be adjusted so that no more than one temperature sensor is out of coke sight for the majority of the push through coke guide 19.

For plotting purposes, two additional temperature sensor locations are assumed in a six-meter battery, one about 6 inches above the uppermost level of expected coke height range 25, the other about 12 inches below the lowermost level of expected coke height range 25. The first temperature sensor location is assumed to be the highest level coke 17 could possibly be. The second temperature sensor location is assumed to be the lowest level coke 17 could possibly be. On smaller 3-meter batteries, the distance between temperature sensors should be reduced accordingly.

Output signals from temperature sensors 20 to 24 represent coke vertical temperature profile data and are fed over sensor leads 27 to 31 to temperature measuring circuits 32. Here the optical pyrometer signals are conditioned, standardized and converted from analog to digital signals which are output on leads 33 to 37. These digital output signals vary proportional to the coke 17 temperature sensed at the various levels in coke guide 19. When the above-noted alternative temperature sensor is employed, temperature measuring circuits 32 are modified to include conditioning and temperature level detectors so that digital on-off signals will be output on each lead 33 to 37. This form of digital signal represents the presence or absence of hot coke 17 exceeding a preset temperature at the respective temperature sensor level in coke guide 19.

Regardless of whether the five coke vertical temperature profile data signals on leads 33 to 37 are digital proportional or digital on-off signals they are selected sequentially by conventional multiplexer 38 and stored as data sets in data storage 39. Both multiplexer 38 and data storage 39 handle one coke vertical temperature profile data set at each of plural intervals I under control of intervalometer 40. Intervalometer 40 is synchronized with coke oven 10 push and may be a repeat pulse timer started when pusher ram 18 is started and output a pulse at each of say forty time intervals I related to the duration of pusher ram 18 movement through coke oven 10, assuming constant ram velocity. Alternatively, intervalometer 40 may be modified to produce say forty length interval I pulses referenced directly to pusher ram 18 movement independent of ram velocity. The first pulse is produced when pusher ram 18 movement starts, the last pulse when the ram stops at the end of the push.

Forty intervals I, whether time or length related, provides a convenient number of five-level, digital proportional or digital on-off, coke vertical temperature profile data sets to be keyed to pusher ram 18 movement. In this manner a length reference is obtained for the location of advancing coke cake for each data set. For this reason, data storage 39 is provided with a 5×40 data matrix connected sequentially to multiplexer 38 for storing five-level data sets in synchronism with intervalometer 40. In practice, this is a height matrix J equal to the known height of temperature sensors 20–24 above coke oven floor 15.

Data storage 39 has additional storage capacity to accommodate battery, oven and charge data 41 fed externally from an operator. Battery data includes plant and battery identification; oven data includes coke oven 10 identification number, number of flues and dimension data, such as height and length; and, if desired, charge data may include the amount and characterization of coking coal charged to coke oven 10.

Figure 3:
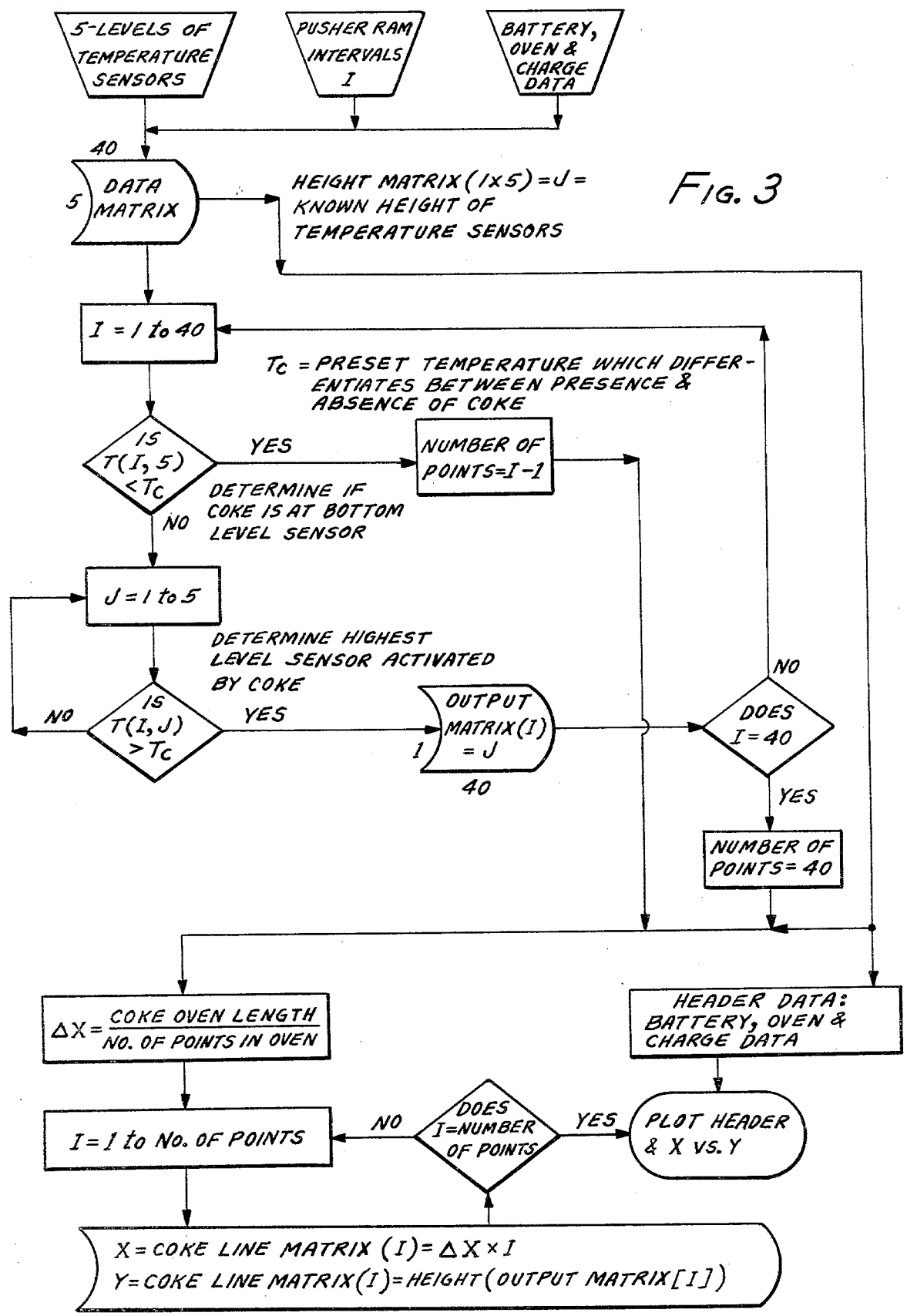
FIG. 3 is a flow chart of essential steps used by the computer in FIG. 1 to determine coke level.

The data stored in data storage 39, namely, five-level J data, pusher ram interval I data and battery, coke oven and charge data, interacts with computer 42, a commercial microcomputer having internal CPU and storage devices programmed according to FIG. 3 flow chart. Computer 42 detects and stores the highest level where coke 17 was present at each of the forty intervals I throughout the pushing cycle. This is done by comparing the temperature measurement at each of the five coke guide levels to a preset temperature $T_c$ which differentiates between the presence and absence of coke 17 at that level.

Computer 42 prepares, stores and outputs X and Y axis plots of detected coke level and interval data, as well as header data representing battery, oven and charge data. Plotter 43 utilizes the detected coke level data, and header data, to represent coke level existent lengthwise of coke oven 10 before pushing. Plotter 43 produces coke level charts 44 to 47 shown in FIGS. 4–7 which indicate the degree of coke oven filling.

Referring to the drawings, particularly FIG. 3, computer 42 scans the 5×40 data matrix which represents coke vertical temperature profile data sets. Computer 42 first scans stored data sequentially which represents five temperature sensor known height parameter J data, then scans each sensor height data between 1 to 40 intervals I data. The next step is to determine if coke was at the bottom level sensor 24 by querying if the stored coke temperature T at interval I, level 5, is less than $T_c$. As mentioned above, $T_c$ is a preset temperature which differentiates between the presence and absence of coke. It has been found that if $T_c$ is about 1650° F., then nearly an order of magnitude of difference occurs between coke at 1650° F. and ambient air at ~200° F. to satisfy the coke differentiating requirement. If the query was yes, disregard the Ith interval and proceed as described below. If the query was no, indicating the bottom level stored coke temperature T was above $T_c$, then proceed to scan height J data between sensor levels 1 to 5.

The next step is detecting and storing the highest level at which coke was observed in each stored coke vertical temperature profile data set. A determination is made of the highest level sensor activated by coke by determining if stored coke temperature T was greater than $T_c$ and repeating such determination through sensor height J data between sensor levels 1 to 5. The highest sensor level J thus determined is placed in a 1×40 output matrix for each of the forty intervals I.

Another query is made to determine if interval I is equal to forty. If no, the necessary steps of determining and storing the highest level sensor activated by coke are repeated. When the query answer is yes, indicating that the number of interval points is equal to forty, the push is over. Or, the push is assumed to be over when coke is no longer present at the lowest sensor level 24 after the Ith interval has been disregarded as described above. The later assumption necessitates placing the lowest temperature sensor, exemplified as sensor 24, in such a position that it will always be monitoring coke temperature T during the pushing cycle.

Another method of determining when the pushing cycle is completed is to utilize the last of the above-mentioned alternative intervalometer 40 length interval signals to indicate pusher ram movement is completed up to the array of temperature sensors 20–24 in coke guide 17.

When the pushing cycle is completed, an actual value of ΔX distance in feet between each time or length interval I of pusher ram 18 movement is calculated in computer 42. This is done by dividing the number of points of interval I data in coke oven 10, exemplified as forty, by the known internal length of coke oven 10 obtained from oven data stored in the data matrix noted above. For each interval I between one and the number of points of interval I data, computer 42 generates and stores in a plot storage matrix, X the distance across coke oven 10 is equal to coke line matrix as function of I, which is equal to ΔX×I. Likewise, computer 42 generates and stores in the plot storage matrix, Y the height above the coke oven floor 15 of the highest of five temperature sensors representing the coke line at I. The Y matrix is done by scanning the coke line height data in coke line output matrix noted above as a function of I and equating this to the known height of coke oven 10 and known height of temperature sensors 20–24 above coke oven floor 15 obtained from oven data stored in the data matrix noted above. The generating and storing of X and Y plot data is continued until I is equal to the number of points of interval I data which is forty as exemplified herein.

Plotting of X matrix data versus Y matrix data, together with the header data consisting of battery, oven and charge data, is accomplished by plotter 43 issuing coke level charts 44–47 shown in FIGS. 4–7. In each of these figures, computer 42 causes plotter 43 to plot a solid-dot observed coke line where coke level was observed by one of the five temperature sensors 20–24. In each of these same figures, computer 42 generates, stores and causes plotter 43 to plot a second or an open-dot unobserved coke line where no coke was observed above the observed coke line. This is done by using the same X matrix data, but shifting the Y matrix data such that each coke line level is increased to a next highest temperature sensor height, thereby indicating a no-coke line. The actual coke line is then located between the observed and unobserved coke lines of charts 44–47.

FIGS. 4–7 are examples of observed and unobserved coke line curves with header data generated by the method of this invention. They are of great value to an operator in determining whether or not coke oven 10 was filled to theoretical coal line 16 shown in FIG. 1, and if not, at what charging hole or holes 11–14 where improper filling occurred. A minor fall-off at both ends of the curves is typical, due in part to a breakdown in coke cake face when the doors are removed from coke oven 10.

FIG. 4 shows coke line chart 44 which exemplifies coke oven 10 as having been properly filled using twenty-one, rather than forty, intervals I during the pushing cycle.

FIG. 5 shows coke line chart 45 which illustrates a classical example of an undercharged coke even 10 where twenty-eight, rather than forty, intervals I were used during the pushing cycle. There are four flat peaks 48–51 which correspond to the four locations of charging holes 11–14, there being three valleys 52–54 located between the four charging holes. It is important to note that the three valleys 52–54 cannot be seen or measured with prior art apparatus or methods by way of charging holes 11–14 in FIG. 1. The only charge heights which can be measured conventionally are those directly under charge holes 11–14. Obviously, this can misrepresent true filling of coke oven 10.

FIG. 6 shows coke line chart 46 which indicates coke oven 10 undercharging occurred between charging holes 11, 12 when using forty intervals I during the pushing cycle. In this case the top temperature sensors were mounted closer together, with sensors 20, 21 about six inches apart. This chart also illustrates the present method being capable of distinguishing minor fluctuations in the coke line.

FIG. 7 shows coke line chart 47 which also indicates coke oven 10 undercharging where level fluctuations were much greater than in FIG. 5 and only twenty-four, rather than forty, intervals I were used during pushing. This chart indicates to an operator that coke oven 10 was greatly undercharged and that corrective measures should be instituted. Such corrective measures include checking charging practice, leveling practice, weigh scales, coal bins and larry car charging bins. FIG. 7 coke line also indicates there were four peaks below four charging holes, as well as a substantial drop-off in charging at both ends of coke oven 10.

I claim:
1. A method of determining batch-processed coke level during a cycle of pushing hot coke from an oven through a coke guide, which method comprises:
(a) measuring coke vertical temperature profile data by sensing plural coke temperatures at plural coke guide levels during lengthwise pushing of the coke, said levels being within an expected coke height range referenced to a coke oven floor;
(b) storing in a data matrix plural coke vertical temperature profile data sets with each set measured at a different one of plural intervals related to the coke oven push;
(c) determining observed coke level data at each of said intervals by detecting the highest level at which a temperature sensor was activated by coke in each stored coke vertical temperature profile data set; and
(d) utilizing the determined coke level data to represent hot coke level existent in the coke oven before the pushing cycle.

2. The method of claim 1 wherein step (a) the coke temperatures are sensed at either equal or unequal heights in the coke guide.

3. The method of claim 1 wherein step (a) one coke temperature is sensed at a level above a theoretical coke line and another at or below said line.

4. The method of claim 1 wherein step (b) storing said intervals are time intervals related to the duration of pusher ram movement.

5. The method of claim 1 wherein step (b) storing said intervals are length intervals referenced directly to pusher ram movement.

6. The method of claim 1 wherein step (c) level detecting includes comparing the temperature measurement at each sensor level to a preset temperature which differentiates between the presence and absence of coke.

7. The method of claim 1 wherein step (d) utilizing includes plotting a record of the determined coke level data to indicate the degree of coke oven filling existent in the coke oven above the floor before the pushing cycle.

8. The method of claim 1 wherein step (b) storing includes storing header data from an external source related to battery, oven or charge data, and wherein step (d) utilizing includes plotting the header data along the plotting a record of the determined coke level data to indicate the degree of coke oven filling existent in the coke oven above the floor before the pushing cycle.

* * * * *